(12) United States Patent
Tuau et al.

(10) Patent No.: US 9,748,630 B2
(45) Date of Patent: Aug. 29, 2017

(54) ANTENNA SYSTEM

(71) Applicant: ALCATEL-LUCENT SHANGHAI BELL CO., LTD, Shanghai (CN)

(72) Inventors: Denis Tuau, Trignac (FR); Loic Vanetti, Trignac (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/915,312

(22) PCT Filed: Aug. 14, 2014

(86) PCT No.: PCT/IB2014/063919
§ 371 (c)(1),
(2) Date: Feb. 29, 2016

(87) PCT Pub. No.: WO2015/028913
PCT Pub. Date: Mar. 5, 2015

(65) Prior Publication Data
US 2016/0211567 A1   Jul. 21, 2016

(30) Foreign Application Priority Data
Aug. 30, 2013 (EP) .................................... 13306188

(51) Int. Cl.
*A47B 96/06* (2006.01)
*H01Q 1/12* (2006.01)
(Continued)

(52) U.S. Cl.
CPC ............ *H01Q 1/125* (2013.01); *F16M 13/02* (2013.01); *H01Q 1/1242* (2013.01); *H01Q 1/246* (2013.01); *H01Q 3/00* (2013.01)

(58) Field of Classification Search
USPC ....................................................... 248/205.1
See application file for complete search history.

(56) References Cited

U.S. PATENT DOCUMENTS 3,898,666 A * 8/1975 Massa ...................... H01Q 1/12
343/702
4,173,761 A * 11/1979 Liautaud .................. H01Q 1/12
343/715
(Continued)

FOREIGN PATENT DOCUMENTS

CN    101197463 A    6/2008
CN    101752646 A    6/2010
(Continued)

OTHER PUBLICATIONS

International Search Report for PCT/IB2014/063919 dated Jan. 28, 2015.
(Continued)

*Primary Examiner* — Monica Millner
(74) *Attorney, Agent, or Firm* — Fay Sharpe, LLP

(57) ABSTRACT

The antenna system comprises a first module ensuring the radiofrequency function and containing at least one antenna and at least one radio connection box, a second assembly module ensuring the fastening and positioning of the antenna system onto a mount, and an interface part ensuring the connection between the first module and the second module and enabling a rotating junction between the first module and the second module. Preferably, the antenna system has a generally smooth round shape.

13 Claims, 7 Drawing Sheets

(51) Int. Cl.
*H01Q 1/24* (2006.01)
*H01Q 3/00* (2006.01)
*F16M 13/02* (2006.01)

(56) References Cited

U.S. PATENT DOCUMENTS

| | | | | |
|---|---|---|---|---|
| 5,291,211 | A * | 3/1994 | Tropper | H01Q 21/205 343/700 MS |
| 5,641,141 | A * | 6/1997 | Goodwin | H01Q 1/12 248/218.4 |
| 5,867,132 | A * | 2/1999 | Blasing | H01Q 1/125 248/218.4 |
| 6,262,691 | B1 * | 7/2001 | Austin | H01Q 1/1221 343/878 |
| 6,512,492 | B2 * | 1/2003 | Overton | H01Q 1/088 343/882 |
| 8,564,497 | B1 * | 10/2013 | Dickie | H01Q 1/1242 343/720 |
| 8,947,319 | B2 * | 2/2015 | Simmons | H01Q 1/007 174/68.1 |
| 9,065,172 | B2 * | 6/2015 | Lewry | H01Q 1/1242 |
| 2002/0105477 | A1 * | 8/2002 | Bragg | H01Q 1/088 343/892 |
| 2003/0080539 | A1 * | 5/2003 | Thompson | B60Q 1/0483 280/727 |
| 2004/0257299 | A1 * | 12/2004 | Tai | H01Q 1/084 343/906 |
| 2009/0322628 | A1 * | 12/2009 | Palmer | H01Q 1/12 343/702 |
| 2011/0285604 | A1 * | 11/2011 | Le Bayon | H01Q 1/42 343/872 |
| 2012/0049021 | A1 * | 3/2012 | Nahar | H01Q 1/2233 248/220.21 |
| 2013/0069845 | A1 * | 3/2013 | Swais | H01Q 1/42 343/872 |
| 2013/0112837 | A1 * | 5/2013 | Spagnolo | H01Q 1/1214 248/535 |
| 2013/0214964 | A1 * | 8/2013 | Holt | G01S 13/882 342/120 |
| 2014/0070069 | A1 * | 3/2014 | Taeger | H01Q 1/1214 248/519 |

FOREIGN PATENT DOCUMENTS

| | | |
|---|---|---|
| JP | 62-084207 | 5/1987 |
| JP | 3-270404 | 12/1991 |
| JP | 5-343912 | 12/1993 |
| JP | 2004-032118 | 1/2004 |
| KR | 20100012684 U | 12/2010 |

OTHER PUBLICATIONS

Office Action in Japanese Patent Application No. 2016-537408; Mar. 2, 2017 (English translation attached).

* cited by examiner (a)

(b)  (c)  (d)

(a)            (b)   (c)

ANTENNA SYSTEM

The present invention pertains to the field of antenna systems, and in particular to a system comprising an antenna and its device for assembling it onto a mount.

BACKGROUND

The deployment of the new generation of cellular telephone networks using the so-called LTE standard (for "Long-Term Evolution"), the increase in the volume of data exchanged and the scale of the corresponding communication traffic, as well as the expansion of the community of users into emerging countries (China, India) require increasing networks' capacity to transmit data. In addition, traditional frequency bands (primarily the domain of 10-40 GHz) are crowded, and the growing density of users in urban networks increases the need for small cells in which the antennas are installed directly in the living spaces of cities.

All of these changes bring with them an increasing number of new requirements. The use of higher frequency bands (56-90 GHz) offers more bandwidth (in GHz) expressed as a percentage of the antenna's central operating frequency. This helps meet bandwidth capacity needs. These high frequencies suffer from higher absorption levels in air/water, so they are more suited to short connections that correspond to the needs of smaller cells. The cells' small size also enables a good compromise for gain, and therefore enables the use of smaller antenna apertures. In order to improve acceptance among the public and the owners of antenna installations in residential areas, it is important to have discrete, low-volume solutions that do not disrupt the landscape as a whole. Network operators have turned this desire into a requirement for so-called "low form factor" antenna requirements, as they have limited ranges, or for equipment that looks completely different from an antenna.

With smaller antennas, the cost of equipment decreases, and as a result the cost factor represented by installing the antenna is drawing more and more attention from operators, who want to reduce and optimize installation times. In conclusion, low form factor antennas operating at high radio frequencies, which allow easy installation and are objectively and subjectively less conspicuous, have now become essential.

Current radio link systems are generally composed of a transmission antenna (which may be of different technical types such as dish, clamshell, patch, horn, etc.), which is supported by a mount fastened to a tower or mast structure, and a radio box that is often mounted directly onto the rear of the antenna, and which consequently is also supported by the antenna's mount. The assembly device is composed of a certain number of mounting elements, screws, nuts, and other fastening elements. However, such a system has multiple drawbacks:
- the antenna remains clearly visible and identifiable as such
- the assembly and installation of such an antenna system takes a relatively long time due to the large number of parts that must be handled by the installers
- depending on the system's technical arrangement, it is likely that the installation process requires more than two hands
- the system does not allow the antenna to be adjusted in both the horizontal plane (azimuth) and the vertical plane (tilt)
- the system is not visually pleasing, and a structure comprising an antenna separate from the assembly device and radio box is far from being optimized with respect to wind resistance.

SUMMARY

In order to eliminate the drawbacks of the prior art, an antenna system is proposed with a pleasing appearance and smaller volume, whose installation is faster and easier.

The subject matter of the present invention is an antenna system comprising
- a first module ensuring the radiofrequency function and containing at least one antenna and at least one radio connection box,
- a second installation module ensuring the fastening and positioning of the antenna system on a mount,
- an interface part ensuring the connection between the first module and the second module and enabling a rotating junction between the first module and the second module to align the antenna.

According to a first aspect, the interface part comprises a first plate capable of being rigidly connected to a contact surface of the first module and a second plate capable of being rigidly connected to a contact surface of the second module.

According to a second aspect, the interface part may be formed of a single part with the first module or with the second module. According to one variant, the interface part may be formed of two sections, a first portion being formed of a single part with the first module and a second section being formed of a single part with the second module.

According to a first configuration, the axis of the first module and the axis of the second module are identical.

According to a second configuration, the axis of the first module and the axis of the second module form a non-zero angle.

According to a first variant, the X-X' axis of the first module and the Y-Y' axis of the second module form a 45° angle β.

According to a second variant, the axis of the first module and the axis of the second module are substantially perpendicular, the axis X-X' of the first module and the axis Y-Y' of the second module forming a 90° angle α.

According to another aspect, the second module is capable of fastening the antenna system onto a tubular or flat mount. Preferentially, the axis Y-Y' of the second module is substantially perpendicular to the axis Z-Z' of the tubular mount.

The proposed solution is a compact antenna system that provides all of the expected functions: Transmitting and receiving radio waves to ensure the antenna's operation, precisely adjusting the antenna in the horizontal (azimuth) and vertical (tilt) planes, and fastening the antenna system onto a mount.

According to one embodiment, the first module comprises
- a cover comprising a front section and a rear section capable of being assembled together,
- at least one antenna,
- at least one connection box fastened to the rear of the antenna,
- an opening facing the antenna,
- a radome placed in the opening.

According to one embodiment, the first module has an at least partially cylindrical shape.

According to one embodiment, the antenna system has a generally smooth round shape.

The general shape of the antenna system is a visually pleasing solution that has multiple advantages. The general round shape, which avoids any flat surface regardless of direction, reduces the wind load as well of the risk of ice or snow accumulating on the antenna system, in particular in cold-climate regions. This antenna system also makes it possible to facilitate assembly and adjustment because it comprises far fewer parts. Finally, the design offers a great deal of flexibility in terms of assembly options; in particular, it may be installed on any mount, particularly a cylindrical or flat mount, thereby making it possible to adapt the antenna system to all environments.

BRIEF DESCRIPTION

Other characteristics and advantages of the present invention will become apparent upon reading the following description of one embodiment, which is naturally given by way of a non-limiting example, and in the attached drawing, in which.

Figure 1:
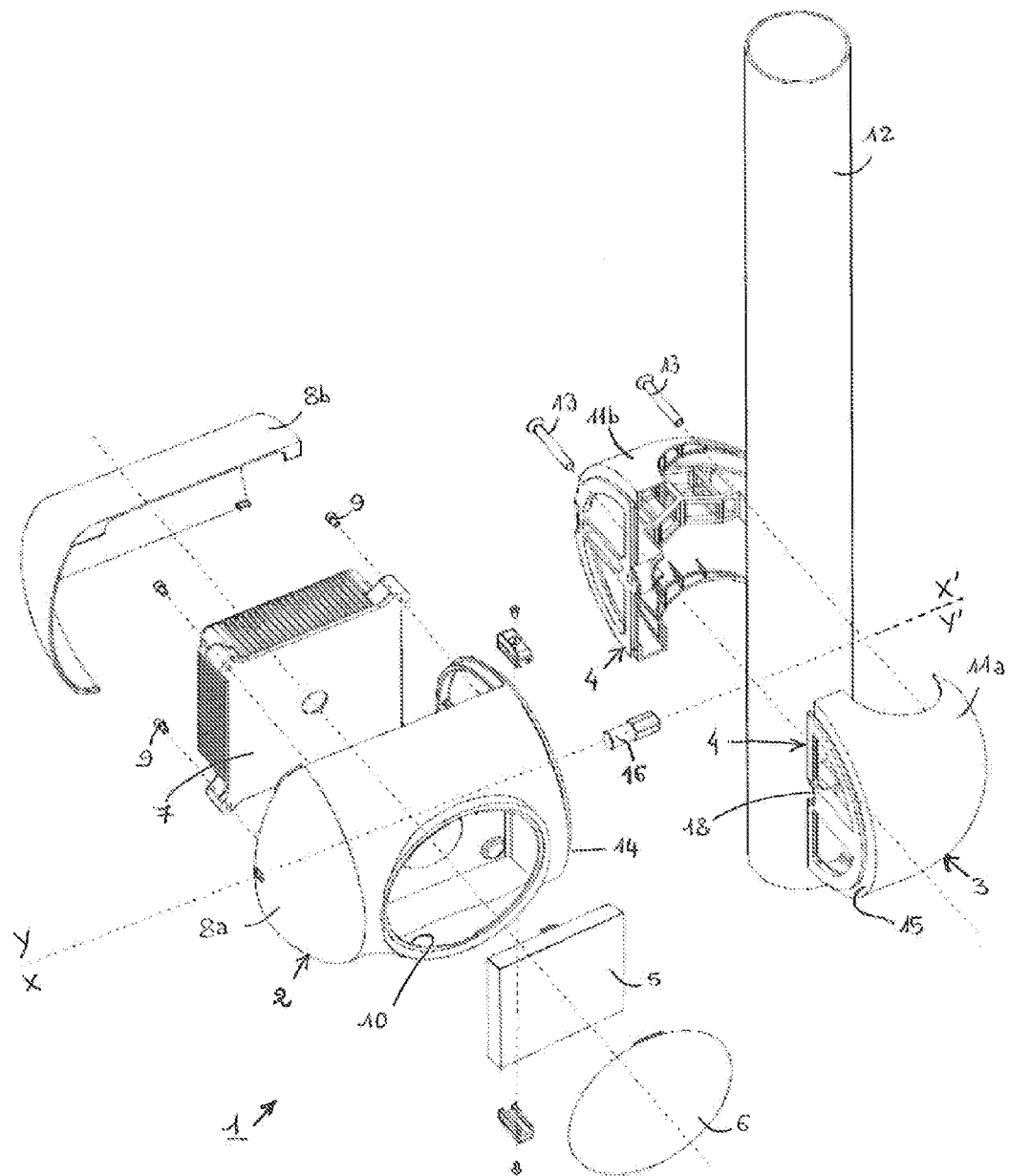
FIG. 1 depicts one embodiment of the antenna system.
Figure 3:
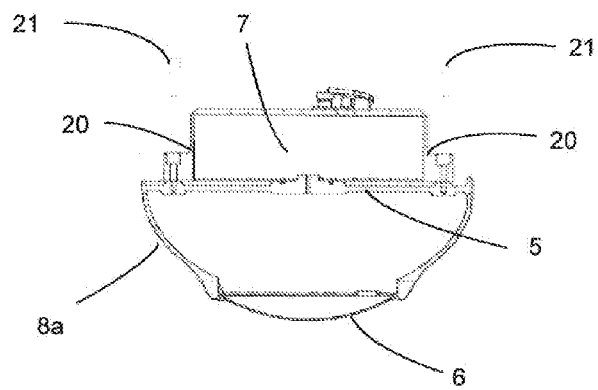
Figure 3:
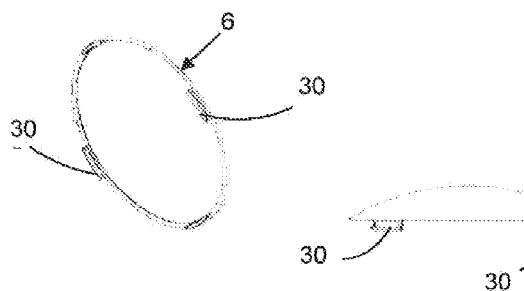
Figure 3:
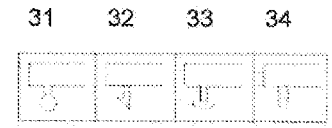
Figure 4:
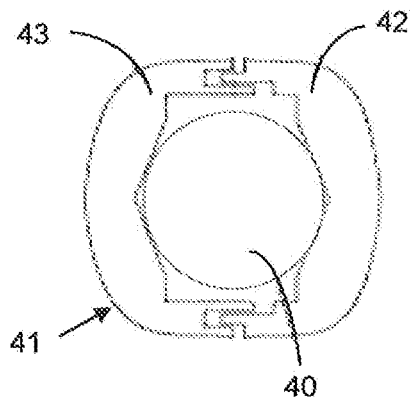
Figure 5:
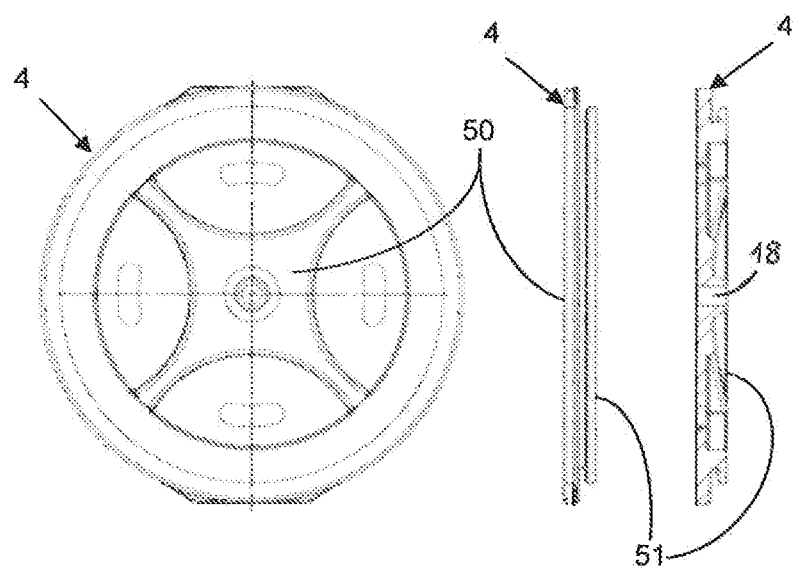
Figure 6:
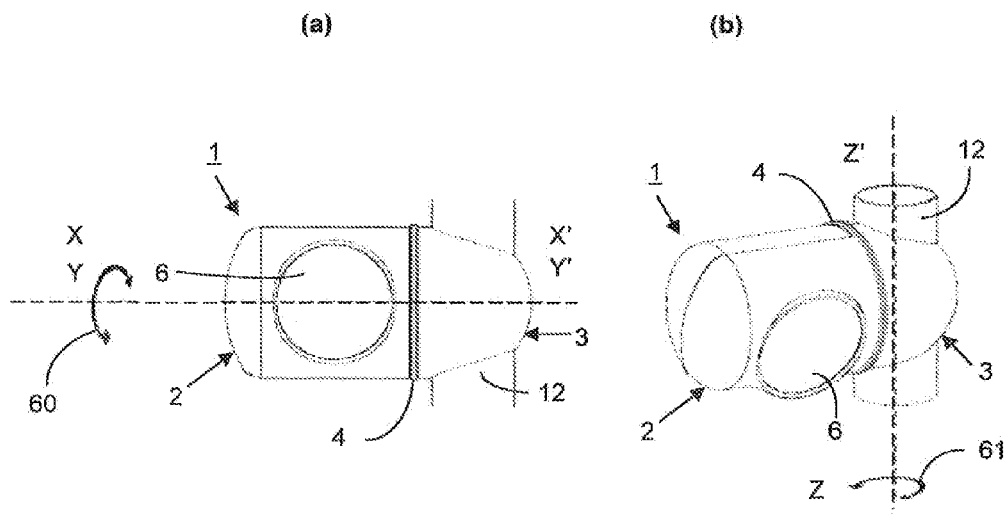
Figure 7:
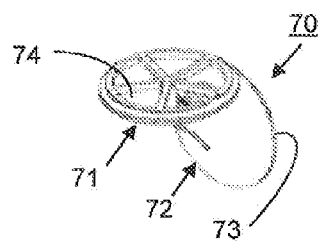
Figure 8:
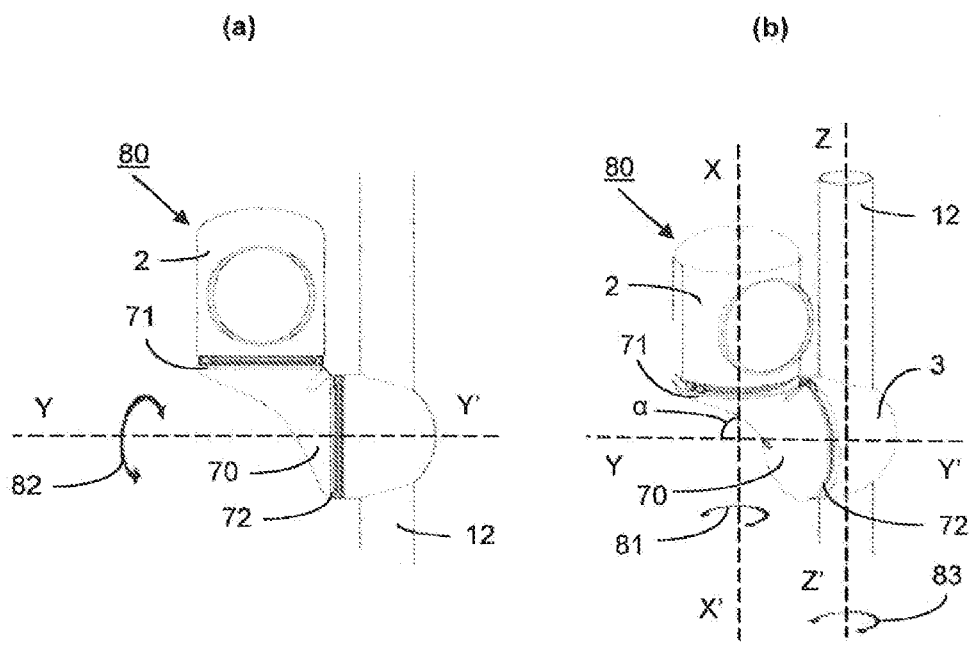
Figure 9:
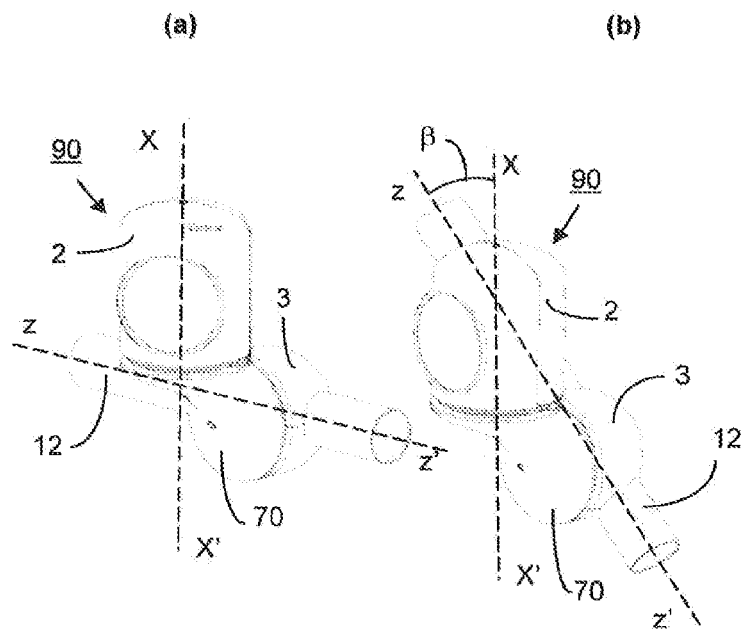
Figure 10:
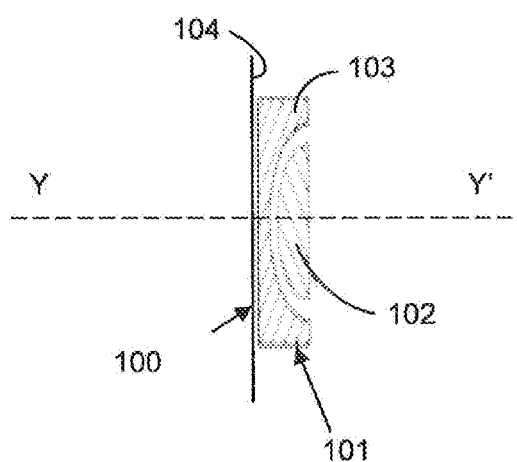
Figure 11:
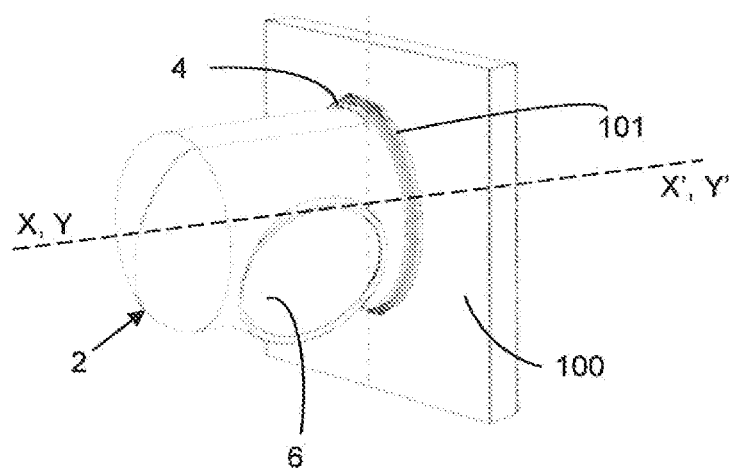

FIGS. 3a to 3d depict a radio connection box and a radome for the antenna system of FIG. 1, FIG. 4 depicts a schematic top view of a first embodiment of the second module for assembling the antenna system onto a tubular mount, FIGS. 5a, 5b and 5c depict the first embodiment of an interface part for an antenna system in the event that the first module and the second module are aligned, FIGS. 6a and 6b respectively depict side and perspective views of a configuration of the antenna system assembled onto a tubular mount in the event that the first module and the second module are aligned, FIG. 7 depicts a second embodiment of an interface part in the event that the first module and the second module are not aligned, FIGS. 8a and 8b respectively depict side and perspective views of another configuration of the antenna system assembled onto a flat mount in the event that the first module and the second module are not aligned, FIGS. 9a and 9b depict perspective views of multiple configurations of the antenna system assembled onto a tubular mount, FIG. 10 depicts a schematic view in cross-section of a second embodiment of the second module for assembling the antenna system onto a flat mount, FIG. 11 depicts a perspective view of a configuration of the antenna system assembled on a flat mount, FIGS. 12a and 12b depict front and perspective views of another configuration of the antenna system assembled onto a flat mount.

DETAILED DESCRIPTION

In the embodiment depicted in FIG. 1, the antenna system 1 comprises at one end a first module 2 particularly intended to ensure the function of transmitting radio waves, and at the opposite end, a second module 3 intended to enable the assembly of the antenna system onto a mount. The first RF module 2 is connected to the second assembly module 3 owing to an interface part 4 that ensures a rotating junction between the first RF module 2 and the second assembly module 3.

In order to fulfill its function, the first RF module 2 must contain at least one antenna and the radio connection box required for its operation. In the present case, an antenna 5, covered by its radome 6, and a radio connection box 7 are placed inside the two-part cover 8a, 8b of the first RF module 2. In a wideband concept, a radome 6 of a specific frequency is used instead of just choosing the material of the cover 8a, 8b.

This antenna system may be applied to a wide range of antenna technologies. The antenna 5 here is depicted in the form of a rectangular block that suggests a network antenna, but it would also be possible to use a dish or offset reflector antenna, or a simple direct-feed antenna like a horn antenna to be placed in the module.

The rear section 8a and the front section 8b of the cover of the first RF module 2 are joined and rigidly connected using stops or flaps 9. Once the two sections 8a, 8b have been joined, the cover 8a, 8b of the first module 2 here has a substantially cylindrical shape and comprises a circular aperture 10 intended to be placed facing the antenna.

The antenna system may be fastened onto all types of mounts. The second assembly module 3 here comprises a mail flange 11a and a female flange 11b intended to tighten around a tubular mount 12, such as a mast, for example. The two flanges 11a, 11b are joined around the tubular mount 12 and rigidly connected, for example by means of bolts 13.

The axis X-X' of the first RF module 2 and the axis Y-Y' of the second assembly module 3 are identical here. The flat interface part 4 is located between the contact surface 14 of the first RF module 2 and a contact surface 15 of the second assembly module 3 in order to connect the two modules 2, 3 allowing them to rotate relative to one another, thereby enabling the first RF module 2 to rotate around its axis X-X' and enabling the second assembly module 3 to rotate around its axis Y-Y'. The interface part 4 may, as in the present case, be formed of a single part with the first RF module 2 or the second assembly module 3. Naturally, since the modules 2, 3 are made of two sections, the interface part 4 will also be in two sections in this case. A centering rod 16 makes it possible to correctly position the modules 2, 3 relative to one another. Once connected, the first RF module 2 and second assembly module 3 form a compact antenna system 1 whose shape is continuously harmonious, homogenous, and seamless, comprising both the radiofrequency and assembly functions. The smooth round shape of the antenna system 1, which prevents any flat surface regardless of the direction in question, improves the mechanical behavior of the antenna system 1 with respect to environmental constraints, particularly by reducing the wind load. The shape of the antenna system 1, and particularly that of the cover 8a, 8b of the first RF module 2, is adapted to be produced from polymer by molding, but other materials may also be used.

Figure 2:
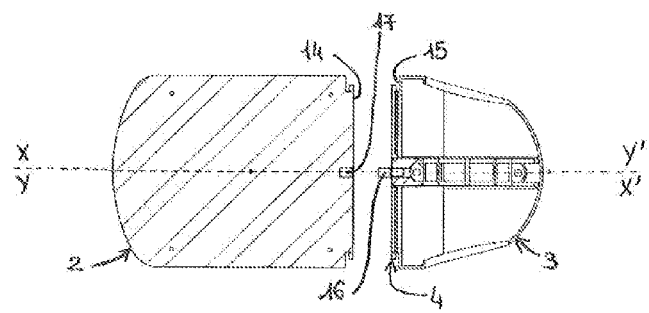
FIG. 2 depicts the connection between the two modules.

FIG. 2 more specifically depicts the coupling of the first RF module 2 and the second assembly module 3 using the cylindrical centering rod 16, which fits into a housing 17 formed in the center of each of the contact surfaces 14 and 15 of the modules 2, 3 and which passes through a through-hole 18 in the center of the interface part 4. The interface part 4 may be formed of a single part either with the first RF module 2, or with the second assembly module 3. The interface part 4 may also be produced in two sections, a first section being of a single part with the first RF module 2 and a second section being of a single part with the second assembly module 3, the connection between the two modules 2, 3 being made by coupling the two sections of the interface part 4.

FIG. 3a depicts a cross-section view of the first RF module 2 from which the rear section 8b of the cover has been removed. The radio connection box 7 is fastened to the rear of the antenna 5 by fastening means 21 that depend on the link defined by the client. The most commonly used fastening means 21 are screws. The radio connection box 7 is protected from environmental restrictions by the rear section 8b of the cover.

A radome 6, depicted in FIGS. 3b, 3c and 3d, is placed in the circular aperture 10 in order to protect the antenna disposed inside the first RF module 2. The radome 6 comprises fast, reversible fastening means 30. Different methods for fastening the radome 6 may be considered. These fastening means 30 may be of different types, such as a quarter-turn screw or a clip that may be of various hooking shapes 31, 32, 33 and 34 intended to mate with the edge of the circular aperture 10 or with a suitable housing formed inside the edge of the circular aperture 10. The fastening means 30 are chosen in such a way that it is easy to change the radome 6, thereby affording great flexibility in how the antenna system 1 is produced.

Such an antenna system may be fastened onto various types of mounts. In FIG. 4, the antenna system is fastened onto a tubular mount 40 by means of second assembly module 41, which comprises a male flange 42 and a female flange 43. The female flange 43 has a shape allowing it to join onto the male flange 42 so as to form a collar that is placed around the mount 40. The link between the flanges 42, 43 is made by fastening means, such as screws for example, which make it possible to exert pressure on to the tubular mount, thereby holding the system in position.

FIGS. 5a, 5b and 5c depict one embodiment of the interface part 4 of FIG. 1 in the event that the axis X-X' of the first RF module 2 and the axis Y-Y' of the second assembly module 3 are identical.

In order to connect the first RF module 2 and the second assembly module 3, the interface part 4 comprises a first plate 50 intended to be rigidly connected with the contact surface 14 of the first RF module 2 and a second plate 51 intended to be rigidly connected with the contact surface 15 of the second assembly module 3. The interface part 4 enables a rotating junction between the first RF module 2 and the second assembly module 3. The interface part 4 here is substantially circular in shape.

We shall now examine FIGS. 6a and 6b, which depict schematic front and perspective views of the antenna system 1 in the event that it is assembled onto the tubular mount 12. The first RF module 2 and the second assembly module 3 are aligned along an axis common to the axes X-X' and Y-Y'. The first RF module 2 may rotate 60 around its axis X-X', while the second assembly module 3 remains fixed. In FIG. 6b, the first RF module 2 has turned around relative to the second assembly module 3. The purpose of this rotation 60 is to move the antenna 5 into the desired position, with the antenna 5 being located within the first RF module 2, behind the radome 6 placed in the circular aperture 10. The second assembly module 3 is placed at a selected height of the tubular mount 12, and before being tightened, can rotate 61 around the axis Z-Z' of the tubular mount 12. This way, the azimuth and tilt of the antenna system 1 may be adjusted while it is being installed on the tubular mount 12. In order to facilitate the pointing of the antenna system, an appropriately shaped tool shared by the various elements that make up the antenna system has been developed.

FIG. 7 depicts another embodiment of an interface part 80 in the event that the axis X-X' of the first RF module 2 and the axis Y-Y' of the second assembly module 3 form a nonzero angle α, which here, as an example, is on the order of 90°. The interface part 70 is rigid and comprises two plates 71 and 72. The plates 71 and 72 together form an angle equal to the angle α formed by the axis X-X' of the first RF module 2 and the axis Y-Y' of the second assembly module 3. The surface 74 of the plate 71 is capable of being rigidly connected to the contact surface 14 of the first RF module 2, and likewise the surface 73 of the plane 72 is capable of being rigidly connected to the contact surface 15 of the second assembly module 3, in order to hold the modules 2, 3 in a preset relative position. Although the interface part is described here for connecting modules whose axes X-X' and Y-Y' form an angle α on the order of 90°, its shape may be modified to adapt to connecting modules whose axes X-X' and Y-Y' form any angle α whatsoever. The presence of the interface part 70 therefore allows the first RF module 2 to rotate around its axis X-X' relative to the interface part 70, and allows the second assembly module 3 to rotate around its axis Y-Y' relative to the interface part 70.

In FIGS. 8a and 8b, an antenna system 80 is fastened to a tubular mount 12 having an axis Z-Z' that is parallel to the axis X-X' of the first RF module 2. The first RF module 2 and the second assembly module 3 are disposed such that the axis X-X' of the first RF module 2 is substantially perpendicular to the axis Y-Y' of the second assembly module 3, the two modules 2, 3 being connected by the previously described interface part 70. The contact surface 14 of the first RF module 2 is rigidly connected to one plate 71 of the interface part 70 and the contact surface 15 of the second assembly module 3 is rigidly connected to the other plate 72 of the interface part 70. This configuration of the antenna system requires a rigid connection that gives the antenna system greater mobility by adding to it an additional axis of rotation. The connection between the contact surface 14 of the first RF module 2 and the plate 71 of the interface part 70 enables the rotation 81 of the first RF module 2 around the axis X-X'. The connection between the contact surface 15 of the second assembly module 3 and the plate 72 of the interface part 70 enables the rotation 82 of the second assembly module 3 around the axis Y-Y'. Before tightening, the second assembly module 3 enables a rotation 83 around the axis Z-Z' of the tubular mount 12.

Different configurations may be obtained, as depicted in FIGS. 9a and 9b, by the relative rotation of the first RF module 2 and the second assembly module 3 owing to the interface part 70.

In FIG. 9a, an antenna system 90 is fastened onto a tubular mount 12 with axis Z-Z' that is substantially perpendicular to the axis X-X' of the first RF module 2. Compared to the previous configuration, the second assembly module 3 has turned and now forms an angle α of roughly 90° relative to the axis X-X' of the first RF module 2, which has been made possible by the rigid interface part 70.

In FIG. 9b, the first RF module 2 has turned around its axis X-X' by about 45°. The second assembly module 3 has also turned around on its axis Y-Y', in such a way that the axis Z-Z' of the tubular mount 12 now forms an angle β, which is, for example, equal to 45°, with the axis X-X' of the first RF module 2. The respective position of the axis X-X' of the first RF module 2 and the axis Y-Y' of the second assembly module 3 is unchanged, and they remain substantially perpendicular. The configurations described above are suitable for all types of tubular mounts, regardless of the tilt of their axis relative to the axes of the first and second modules, thereby preserving the geometric continuity of the antenna system's shape.

The antenna system may also be fastened onto a flat mount 100 by means of a second assembly module 101 that comprises a male flange 102 and a female flange 103, as depicted in FIG. 10. The axis Y-Y' of the second assembly module 3 is perpendicular to the surface 104 of the flat mount 100. The female flange 103, also called the wall plate, is applied and fastened onto the flat mount 100 with the assistance of conventional means, such as dowels or threaded rods. The male flange 102 is recessed and fastened into the female flange 103 in order to form the second assembly module 101. The second assembly module 101 may be rigidly connected to the first RF module 2. The smooth round harmonious shape of the antenna system 1 prevents all flat surfaces not protected by the mount 100, which improves the mechanical behavior of the antenna system 1 with respect to the environmental restrictions.

Figure 12:
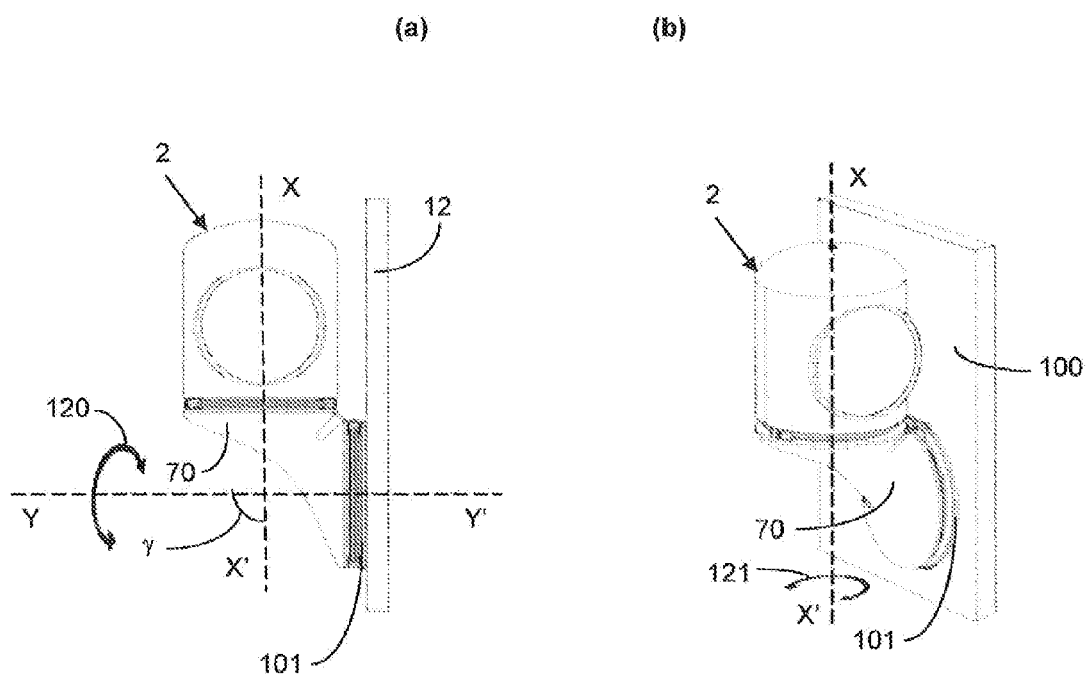

The antenna system may thereby be fastened onto a flat mount 100, such as a wall, based on several configurations as depicted in FIGS. 11 and 12.

FIG. 11 depicts a first RF module 2 and a second assembly module 101 when their respective axes X-X' and Y-Y' are identical. In this case, the connection between the first RF module 2 and the second assembly module 101, by means of the interface part 4, only enables the rotation of the first RF module 2 itself around the axis X-X' in order to orient the antenna 5 placed behind the radome 6 in the desired direction.

FIGS. 12a and 12b depict a first RF module 2 and a second assembly module 101 when their respective axes X-X' and Y-Y' form a non-zero angle γ, for example on the order of 90°. The antenna system may then be fastened onto a wall whose surface is parallel to the axis X-X' of the first RF module in order to provide even more flexibility in adjusting the azimuth pointing direction of the antenna.

Although the number of parts has been minimized, this antenna system, because of its modularity, offers a variety of assembly options using just three subassemblies:
- one module assigned to the RF functionality containing the radio box and the antenna,
- one assembly module ensuring the fastening onto a mount, which may in particular be flat or tubular, though other mounts are conceivable,
- one interface part having two functions: first, it connects the two previous modules, particularly in the event that those two modules are not aligned along the same axis, and second, it allows the antenna's orientation to be adjusted.

Owing to the various shapes that the interface part may adopt, different assembly options are possible. It has been shown that the antenna system may be fastened to either a flat mount or to a tubular mount, regardless of its orientation relative to the axis X-X' of the first RF module containing the antenna. In particular, the following configurations may be conceived:
- assembly onto a tubular mount whose axis is substantially parallel to the axis of the RF module containing the antenna,
- assembly onto a tubular mount whose axis is substantially perpendicular to the axis of the RF module containing the antenna,
- assembly onto a tubular mount whose axis forms any angle with the axis of the RF module containing the antenna,
- assembly onto a flat mount whose axis is substantially parallel to the axis of the RF module containing the antenna,
- assembly onto a flat mount whose axis is substantially perpendicular to the axis of the RF module containing the antenna, The degrees of freedom that make it possible to align the antenna, both in its azimuth (adjusting the angle in the horizontal plane) and tilt (adjusting the angle in the horizontal plane) directions, depends on the implemented configuration required by the installation site. These different configurations are made possible by the flexibility of joining the first RF module and the second assembly module owing to the variable profile of the interface part, which both enables mobility between the modules and holds the antenna system in position.

Naturally, the present invention is not limited to the described embodiments, but is, rather, subject to many variants accessible to the person skilled in the art without departing from the spirit of the invention.

The invention claimed is:

1. An antenna system comprising:
    a first module arranged along a first axis X-X', and containing at least one antenna and at least one radio connection box;
    a second installation module arranged along a second axis Y-Y', and configured to fasten and position the antenna system on a mount disposed along a third axis Z-Z', and said second module being adapted to perform a first rotation about said third axis Z-Z';
    an interface part ensuring a connection between the first module and the second module, a connection between the interface part and the first module allowing a second rotation of the first module around the first axis X-X', and a connection between the interface part and the second module allowing a third rotation of the interface part and the first module about the second axis Y-Y'; and
    the antenna system allowing the alignment of the antenna by the first rotation, the second rotation and the third rotation.

2. The antenna system according to claim 1, wherein the interface part comprises a first plate capable of being rigidly connected to a contact surface of the first module and a second plate capable of being rigidly connected to a contact surface of the second module.

3. The antenna system according to claim 1, wherein the interface part may be formed of a single part with the first RF module or with the second installation module.

4. The antenna system according to claim 3, wherein the interface part may be formed in two sections, a first section being formed of a single part with the first module and a second section being formed of a single part with the second module.

5. The antenna system according to claim 1, wherein the axis X-X' of the first module and the axis Y-Y' of the second module are identical.

6. The antenna system according to claim 1, wherein the axis X-X' of the first module and the axis Y-Y' of the second module form a non-zero angle.

7. The antenna system according to claim 6, wherein the axis X-X' of the first module and the axis Y-Y' of the second module form a 45° angle β.

8. The antenna system according to claim 6, wherein the axis X-X' of the first module and the axis Y-Y' of the second module form a 90° angle α.

9. The antenna system according to claim 1, wherein:
    the second installation module is capable of fastening the antenna system onto the mount; and
    the mount is either tubular or flat.

10. The antenna system according to claim 9, wherein the second axis Y-Y' of the second module is substantially perpendicular to the third axis Z-Z' of the mount, and wherein the mount is tubular.

11. The antenna system according to claim 1, wherein the first module comprises:
- a cover comprising a front section and a rear section capable of being assembled together,
- an opening facing the antenna, and
- a radome placed in the opening; and
- wherein the at least one connection box is fastened to a rear of the antenna.

12. The antenna system according to claim 1, wherein the first module has an at least partially cylindrical shape.

13. The antenna system according to claim 1, having wherein a cover of the first module has a generally smooth round shape.

* * * * *